United States Patent

Vega et al.

Patent Number: 5,658,051
Date of Patent: Aug. 19, 1997

[54] GIMBALED WEB GUIDE FOR A SEAT-INTEGRATED-BELT RESTRAINT SYSTEM

[75] Inventors: Daniel Vega, Westland; Herbert R. Jung, Rochester Hills, both of Mich.

[73] Assignee: AlliedSignal Inc., Morristown, N.J.

[21] Appl. No.: 580,222

[22] Filed: Dec. 28, 1995

[51] Int. Cl.⁶ .................................................. B60R 22/26
[52] U.S. Cl. ............................................. 297/483; 280/808
[58] Field of Search ............................... 297/483; 280/808

[56] References Cited

U.S. PATENT DOCUMENTS

| | | | |
|---|---|---|---|
| 4,005,904 | 2/1977 | Weman et al. | 297/483 |
| 4,191,400 | 3/1980 | Smith | 280/808 |
| 4,222,609 | 9/1980 | Andersson | 297/483 X |
| 4,718,696 | 1/1988 | Koide et al. | 297/483 X |
| 4,838,388 | 6/1989 | Cunningham | 297/483 X |
| 5,020,856 | 6/1991 | George | 297/483 |
| 5,088,794 | 2/1992 | Iwami et al. | 297/483 |
| 5,123,673 | 6/1992 | Tame | 280/808 X |
| 5,295,713 | 3/1994 | McCune | 297/483 X |
| 5,364,170 | 11/1994 | West | 297/483 |
| 5,544,917 | 8/1996 | Loxton et al. | 280/808 X |
| 5,556,171 | 9/1996 | Busch | 297/483 |

FOREIGN PATENT DOCUMENTS

| | | | |
|---|---|---|---|
| 223582 | 5/1987 | European Pat. Off. | 280/808 |
| 2400992 | 7/1974 | Germany | 297/483 |
| 2648875 | 12/1977 | Germany | 297/483 |
| 2817741 | 10/1979 | Germany | 297/483 |
| 1237241 | 9/1989 | Japan | 280/808 |
| 4303054 | 10/1992 | Japan | 280/808 |
| 5301560 | 11/1993 | Japan | 280/808 |

Primary Examiner—Peter M. Cuomo
Assistant Examiner—David E. Allred
Attorney, Agent, or Firm—Markell Seitzman

[57] ABSTRACT

An occupant safety apparatus comprising: a gimbaled web guide (80, 80') having a first member (90, 130) defining a belt exit slit (92) and a gimbaled support structure (94, 96, 100, 102, 130) for permitting the first member to rotate about at least two generally perpendicular axes. This support structure also permits the first member to rotate about a third axis.

6 Claims, 3 Drawing Sheets

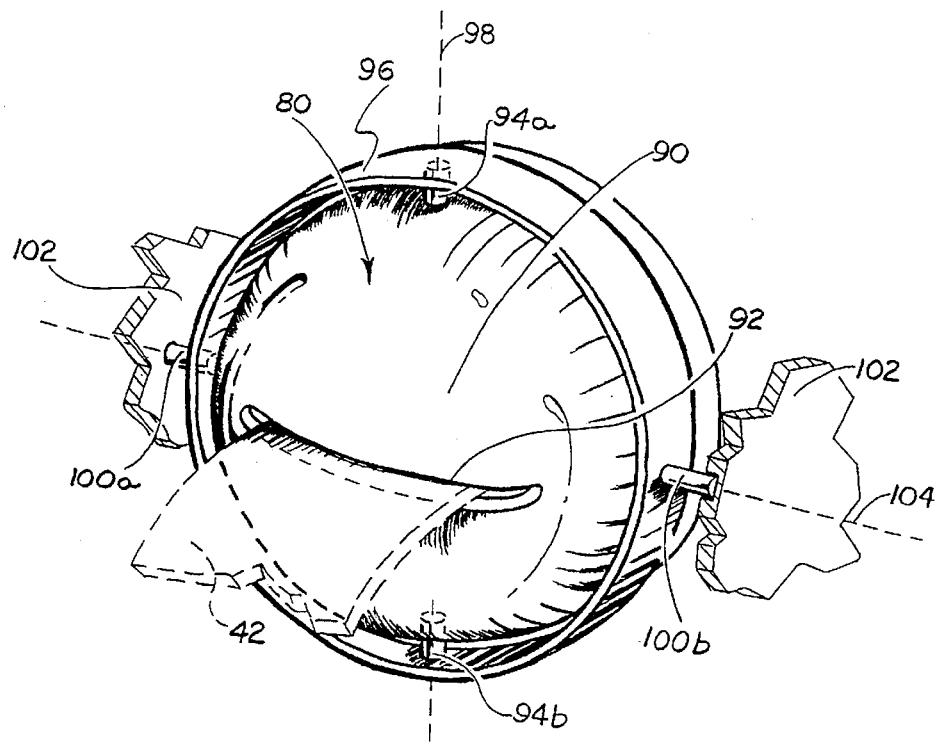
FIG-3
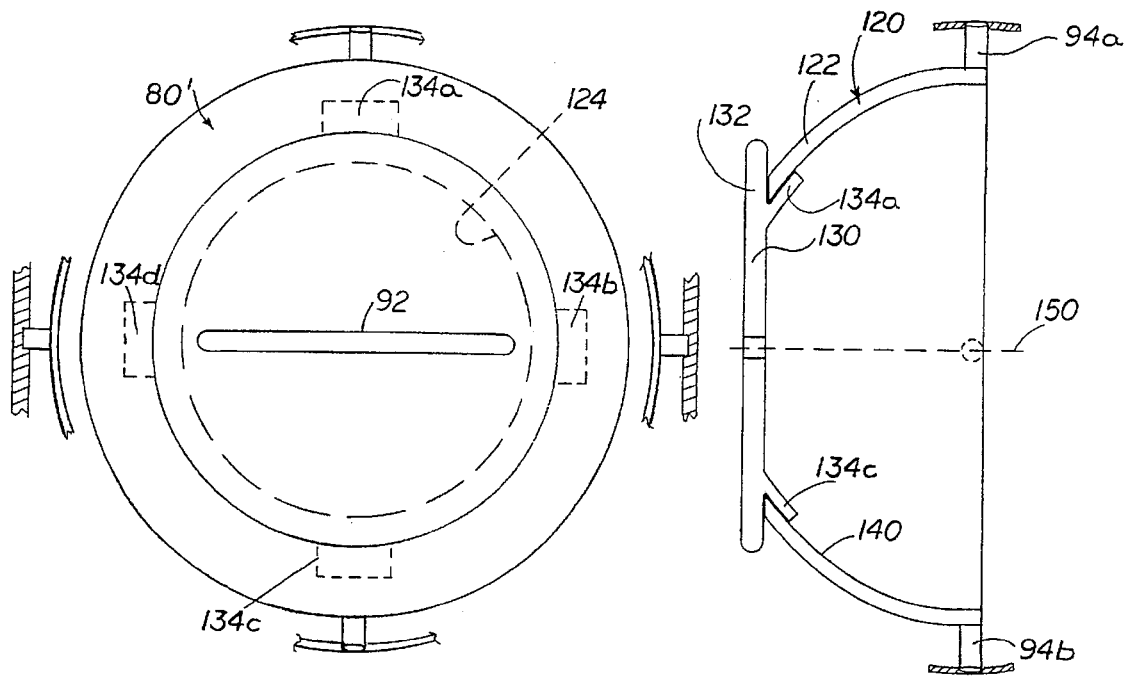
FIG-5
FIG-6

GIMBALED WEB GUIDE FOR A SEAT-INTEGRATED-BELT RESTRAINT SYSTEM

BACKGROUND AND SUMMARY OF THE INVENTION

The present invention relates generally to seat belt restraint systems and more particularly to an improved web guide.

Some automotive seats include a three-point seat belt system integrated within a vehicular seat, sometimes referred to as a seat-integrated-belt (SIB) system. In these systems the shoulder belt exits from a point in the top of the seat. This exit point is adjustable to accommodate the varying sizes of the occupant in an effort to have the shoulder belt cross over the upper torso in a comfortable, yet preferred location to protect the occupant.

It is an object of the present invention to provide a safety belt system and in particular an improved web guide for an SIB occupant restraint system.

Accordingly the invention comprises: an occupant safety apparatus comprising: a web guide having a first member defining a belt exit slit and a gimbaled support structure for permitting the first member to rotate about at least two generally perpendicular axes. This support structure also permits the first member to rotate about a third axis. In the preferred embodiment of the invention the first member is spherically shaped.

BRIEF DESCRIPTION OF THE DRAWINGS

In the drawings:

FIGS. 2, 3 and 4 illustrate details of a first embodiment of the invention.

FIGS. 5 and 6 illustrate an alternate embodiment of the invention

DETAILED DESCRIPTION OF THE DRAWINGS

Figure 1:
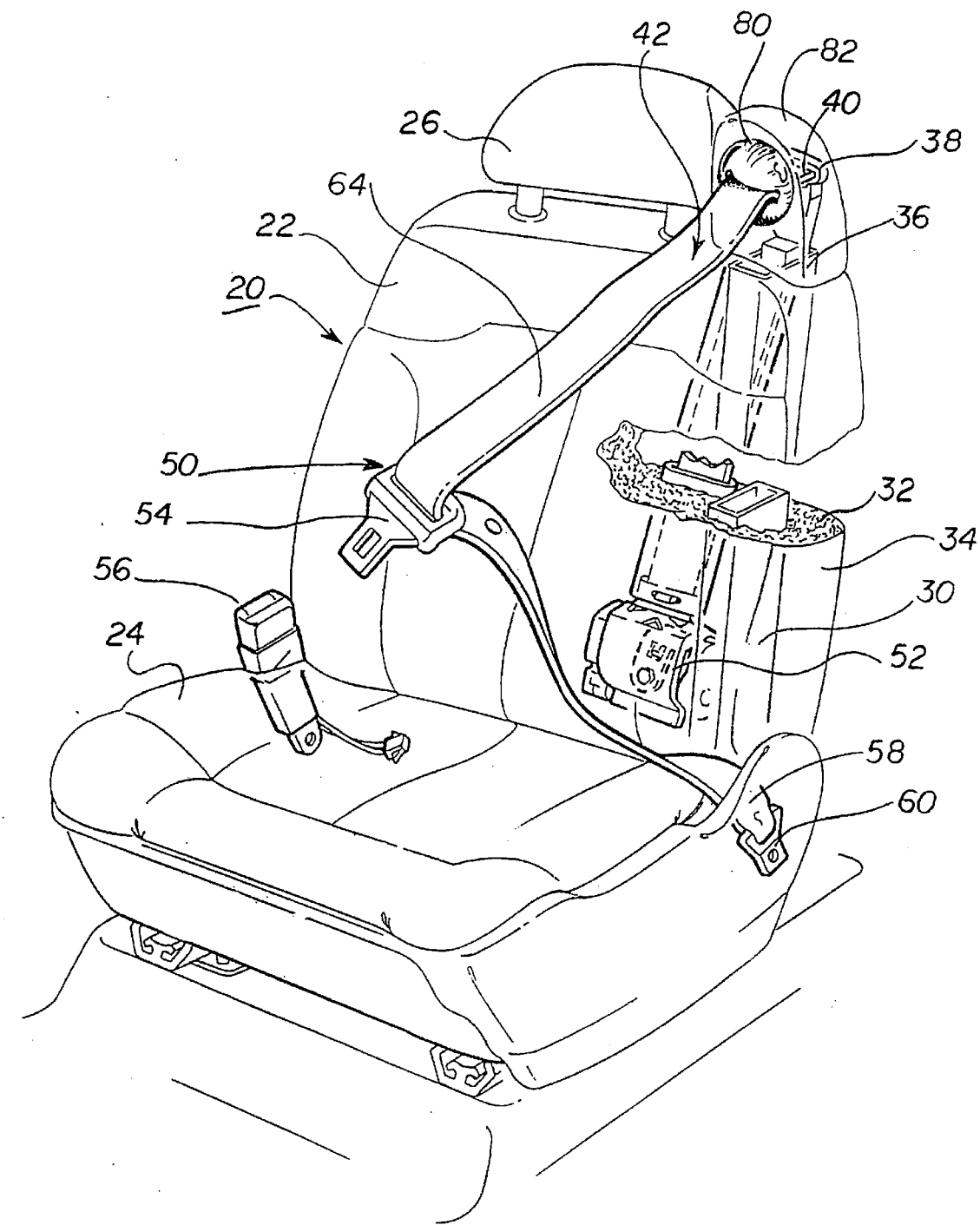
FIG. 1 illustrates an orthogonal view of an automotive seat incorporating the present invention.

FIG. 1 illustrates a conventional automotive seat 20 having a seat back 22, a seat cushion 24 and headrest 26. The headrest may be integrated within the seat back 22 or a separate moveable part as illustrated. Situated within the back 22 of the seat 20 is a structural support, part of which is illustrated as 30. This support member 30 and others within the seat back 22 provide a supportive skeleton about which foam 32 and an exterior covering 34 are laid.

Extending from the top 36 of the member 30 is a web support 38 having a fixed, horizontal slit 40 therein through which a seat belt generally shown as 42 extends. During an accident the web support and support member 30 absorb the crash forces. The seat belt is part of a three-point safety system 50 comprising the structural web support 40, retractor 52, a tongue 54 slidably positioned about the seat belt 42, and a buckle 56. An end 58 of the seat belt 42 is attached via anchor 60 to the seat. As can appreciated the tongue divides the seat belt 42 into a lap belt portion 62 and a shoulder belt portion 64.

As can be seen from FIG. 1, after the seat belt or webbing 42 exits the structural web support 38 it extends through a web guide 80, the purpose of which is to redirect the shoulder belt 64 across the body of the occupant. This web guide 80 is typically not designed to withstand or absorb the impact loads during a crash. The load absorbing function is achieved by the support 38. The web guide 80 is part of and integrated in a cover 82 which protectively covers the top 36 of the support member 30 and the web support 38. This cover 82 may be a separate part or integrated within the seat back or headrest.

Figure 2:
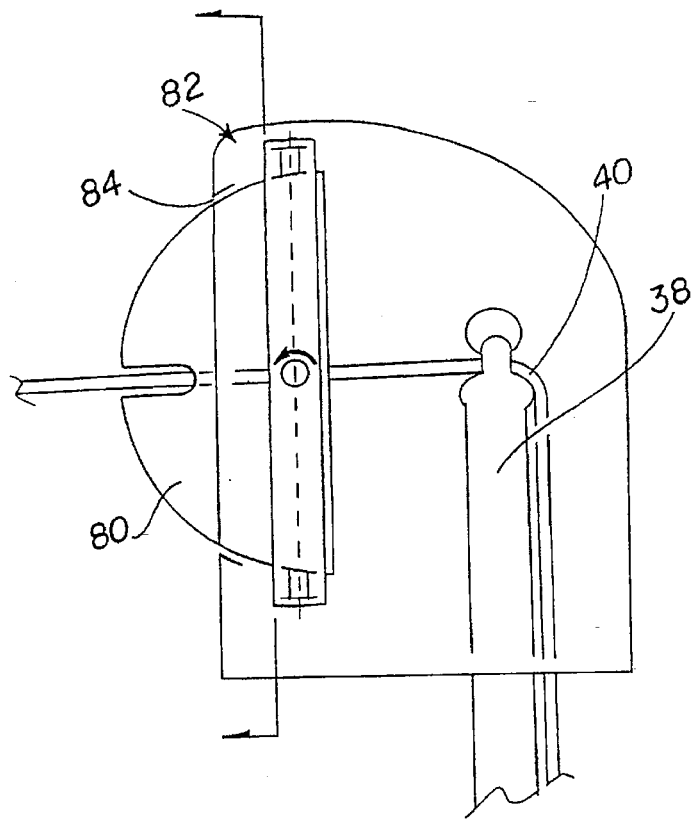
Figure 4:
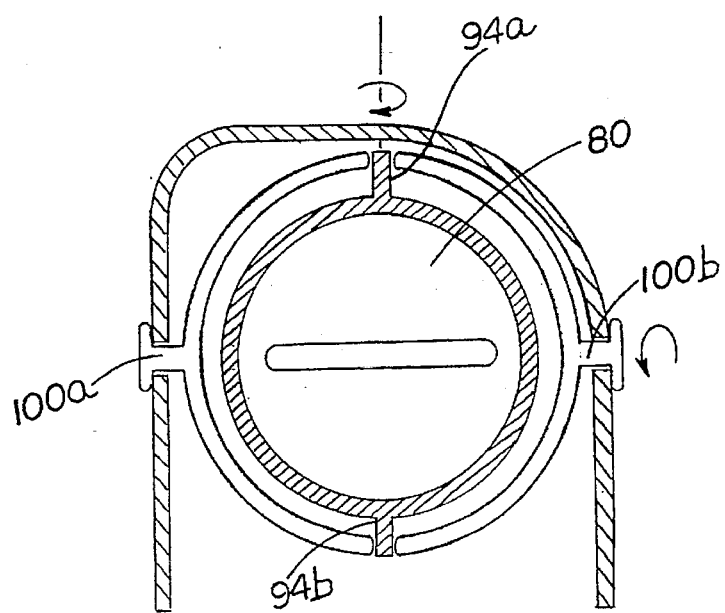

FIG. 2 illustrates a cross-sectional view of the cover 82 illustrating the support 38 and slot 40. The cover 82 includes a circular opening 84. As can be seen from FIGS. 2 and 3 the web guide 80 comprises a hollow semi-spherical guide member 90 having a web guide slit 92 therein. Extending outwardly from the top and bottom of the member 90 are pivot axles or pins 94a and 94b respectively which are rotatably received within a first gimbal 96 thereby permitting the member 90 to rotate about a vertical axis generally shown by numeral 98. As can be seen, the gimbal comprises a circular band of material surrounding the member 90. The right and left sides of this gimbal include pivot axles or pins 100a and 100b that are pivotably secured within a support structure generally designated as 102 thereby permitting the gimbal 96 and hence the member 90 the ability to rotate about a horizontal axis generally shown as 104. The webbing 42 is shown in phantom line exiting the slot 92. The support structure 102 illustrated in FIG. 3 is formed by the sides of the cover 82. FIG. 4 illustrates a plan view of the web guide 80.

As can be appreciated the exit angle of the webbing 42 relative to the cover 82 or seat back 22 will vary according to the physical size of the occupant. However, by providing a web guide 80 with at least the two degrees of freedom, that is, the ability to rotate about the vertical axis 98 and the horizontal axis 104 (which is generally parallel to the plane of the back of the seat) permits the webbing to be positioned about the occupant without binding in the slot, increases comfort, and provides for adjustment at different seat belt angles.

Reference is made to FIGS. 5 and 6 which illustrate a further embodiment of the invention. These figures illustrate an alternate web guide 80' which provides a third degree of freedom for web motion. This embodiment utilizes a truncated spherical member 120 having walls 122 defining a front opening 124. As in the embodiment illustrated above, the member 120 includes pivot axles 194a and 194b for connection to a gimbal 96 (not shown in FIGS. 5 and 6). The opening 124 is enclosed by a plastic insert 130. This insert 130 comprises a circular member 132 that is generally oversized relative to the opening 124. The member 130 includes a plurality of tabs 134a–134d which are received against the inside 140 surface of the walls 122 thereby preventing the member 130 from popping out of the hole 124. The tabs 134a–134d are slidably received about the inside 140 of the walls 122 to permit the member 130 to rotate about a third axis 150. The member 130 further includes the web exit slot 92 which is shown as a flat slot.

Many changes and modifications in the above described embodiment of the invention can, of course, be carried out without departing from the scope thereof. Accordingly, that scope is intended to be limited only by the scope of the appended claims.

We claim:

1. An occupant safety apparatus comprising:

a web guide (80, 80') having a first member (90, 120, 130) with at least a base portion which is spherically shaped, said first member defining a belt exit slit (92) and means (94, 96, 100, 102, 130) for permitting the first member to rotate about at least two generally perpendicular axes.

2. The device as defined in claim 1 wherein the said means further includes means for permitting a portion of the first member to rotate about a third axis.

3. The device as defined in claim 2 wherein the third axis is generally perpendicular to the first and second axes.

4. The apparatus as defined in claim 1 in combination with a seat belt support member (38) positioned to the rear of the web guide (80, 80') for absorbing crash loads during an emergency, the seat belt extending from this support member (38) and through the exit opening (92) of the web guide (80, 80').

5. The apparatus as defined in claim 4 wherein the web guide (80, 80') and the support member (38) are integrated within an automotive seat.

6. The apparatus as defined in claim 2 wherein the means for permitting a portion of the first member to rotate about the third axis includes a first opening within said spherically shaped base portion of said first member and a circular member slidably received within the first opening; the circular member includes the belt exit slit (92).

* * * * *